Sept. 5, 1950 W. R. CHADWICK 2,521,343
MEASURING SPOON
Filed Feb. 1, 1949
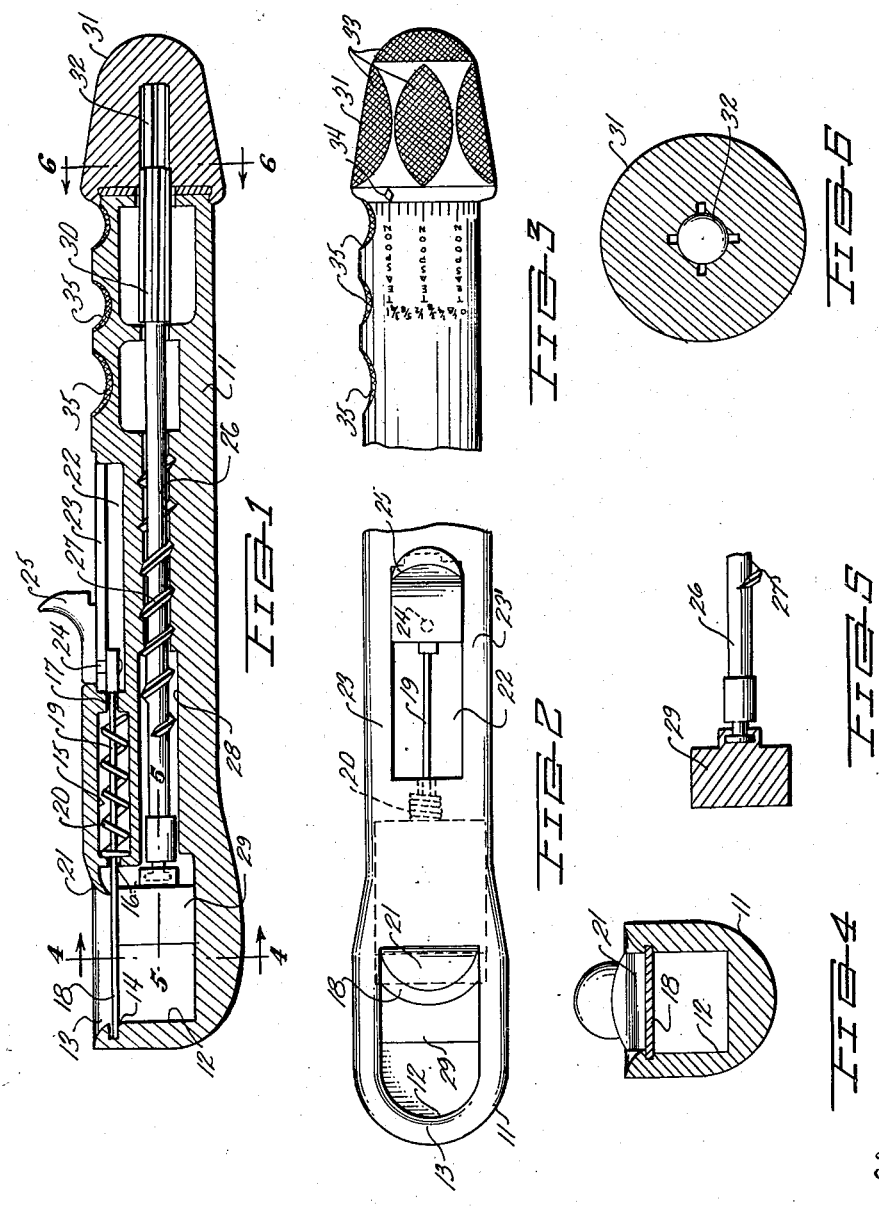
Inventor
WILLIAM R. CHADWICK Patented Sept. 5, 1950

2,521,343

UNITED STATES PATENT OFFICE 2,521,343

MEASURING SPOON

William R. Chadwick, Standish, Calif.

Application February 1, 1949, Serial No. 73,880

3 Claims. (Cl. 73—429)

This invention relates to measuring spoons, and more particularly to a measuring spoon of the adjustable type.

A main object of the invention is to provide a novel and improved measuring spoon of the adjustable type which is simple in construction, very easy to manipulate and which provides a very accurate measurement of material employed therewith.

A further object of the invention is to provide an improved adjustable measuring spoon which is inexpensive to manufacture, sturdy in construction, compact in size and neat in appearance.

Further objects and advantages of the invention will become apparent from the following description and claims and from the accompanying drawings, wherein:

Figure 1 is a longitudinal cross-sectional view taken through an adjustable measuring spoon constructed in accordance with the present invention.

Figure 2 is a fragmentary top plan view of the forward end portion of the measuring spoon of Figure 1.

Figure 3 is a fragmentary side elevational view of the rear portion of the measuring spoon of Figure 1.

Figure 4 is a cross-sectional detail view taken on line 4—4 of Figure 1.

Figure 5 is a detail cross-sectional view taken on line 5—5 of Figure 1.

Figure 6 is a cross-sectional view taken on line 6—6 of Figure 1.

Referring to the drawings, 11 designates an elongated body member made of molded plastic or the like, and formed at its forward end with an open cavity 12, the rim of the cavity being inwardly bevelled as shown at 13. Subadjacent bevelled rim 13 the cavity wall is grooved as shown at 14, the groove sides merging with a cavity 15 formed in body 11 rearwardly of the open cavity 12. The front wall of cavity 15 is formed with a horizontal slot 16 and the rear wall of said cavity 15 is formed with a central aperture 17. Slidably positioned in the groove 14 and the slot 16 is a cover plate 18 secured to a rearwardly extending rod 19 passing through aperture 17. Encircling rod 19 in cavity 15 is a coiled spring 20 which bears at one end on the rear wall of cavity 15 and at the other end on the rear edge of plate 18, biasing said plate to a closed position with respect to cavity 12. Designated at 21 is a forwardly and downwardly projecting guard lip formed on body 11 which overlies plate 18 and prevents material from entering slot 16.

Designated at 22 is a longitudinally extending recess formed in body 11 in rearward alignment with cavity 15 and having inwardly projecting top flanges 23, 23.' Secured to the end of rod 19 by a vertical pin 24 is a finger-engaging member 25, which, when retracted moves plate member 18 to an open position, as shown in Figure 2, compressing the spring 20. When finger-engaging member 25 is released, spring 20 expands, returning plate member 18 to closed position.

Designated at 26 is an axial shaft formed with screw threads 27 threadedly engaged in internal threads formed in an axial bore 28 in body 11, through which shaft 26 extends. The forward end of shaft 26 is rotatably secured to a piston member 29 slidably positioned in cavity 12. Secured to the rear end portion of shaft 26 is a splined male member 30. Rotatably secured to the rear end of body 11 is a cap member 31 formed with a splined bore 32 slidably receiving the splined male member 30. Rotation of cap member 31 with respect to body 11 produces longitudinal movement of piston 29 in cavity 12 by the screw action of shaft 26 in the internally threaded bore 28. Cap member 31 is suitably knurled as shown at 33 and is provided at its rim with an index mark 34. Adjacent said rim the external surface of body 11 is provided with volumetric markings. The volume of cavity 12 corresponding to a particular position of adjustment of piston 29 therein may be read by observing the position of index mark 34 with relation to said volumetric markings.

The rear portion of body 11 is formed with knurled finger grip recesses 35 to facilitate the manipulation of the measuring spoon.

In using the spoon, cap member 31 is rotated to bring index mark 34 adjacent a desired volumetric designation, which thereby moves piston 29 to a position in cavity 12 providing the desired volume forwardly of said piston in the cavity 12. Member 25 is then retracted and the forward end of the spoon is dipped into the material to be measured out, filling the free space in cavity 12. Finger-engaging member 25 is then released, allowing plate member 18 to move to closed position, and trapping the desired volume of material in cavity 12.

As shown in Figure 3 the volumetric markings on body 11 may be in fractions of a teaspoon, or may be calibrated in terms of any other common unit of volume.

While a specific embodiment of an adjustable measuring spoon has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A measuring spoon comprising an elongated body member formed at one end with an open cavity, a piston member slidably positioned in said cavity, a shaft member threaded through said body member and rotatably secured to said piston member, a cap member rotatably secured to the other end of said body member and slidably but non-rotatively receiving said shaft member, a movable closure member for said cavity overlying said piston member, and means biasing said closure member to closed position.

2. A measuring spoon comprising an elongated body member formed at one end with an open cavity, a closure plate slidably positioned in said cavity adjacent its top rim and rearwardly slidable with respect to said cavity, spring means biasing said plate forwardly into overlying relation to said cavity, a piston member slidably positioned in said cavity and movable longitudinally therein, a shaft member threaded axially through said body member and rotatively secured at one end thereof to said piston member, a cap member rotatably secured to the other end of said body member and formed with a non-circular bore, and a male spline member carried on the shaft member and slidably fitting said bore.

3. A measuring spoon comprising an elongated body member formed at one end with an open cavity, said cavity being grooved adjacent its top rim a closure plate slidably positioned in the grooves, spring means biasing the plate into overlying relation to said cavity, a finger-engaging member secured to the plate for retracting the plate against the force of said spring means, a piston member slidably positioned in said cavity and movable longitudinally therein, a shaft member extending axially through said body member and rotatively secured at its forward end to said piston member, cooperating screw threads on the shaft member and the body member producing longitudinal movement of said shaft member responsive to axial rotation thereof, and a cap member rotatably secured to the other end of the body member and slidably but non-rotatively receiving the rear end of said shaft member.

WILLIAM R. CHADWICK.

REFERENCES CITED

The following references are of record in the file of this patent:

UNITED STATES PATENTS

| Number | Name | Date |
|---|---|---|
| 335,390 | Silbermann et al. | Feb. 2, 1886 |
| 1,163,751 | Hauerbach et al. | Dec. 14, 1915 |